Feb. 23, 1965 R. E. BURKHART 3,170,191
TIRE CURING PRESS
Filed July 19, 1963
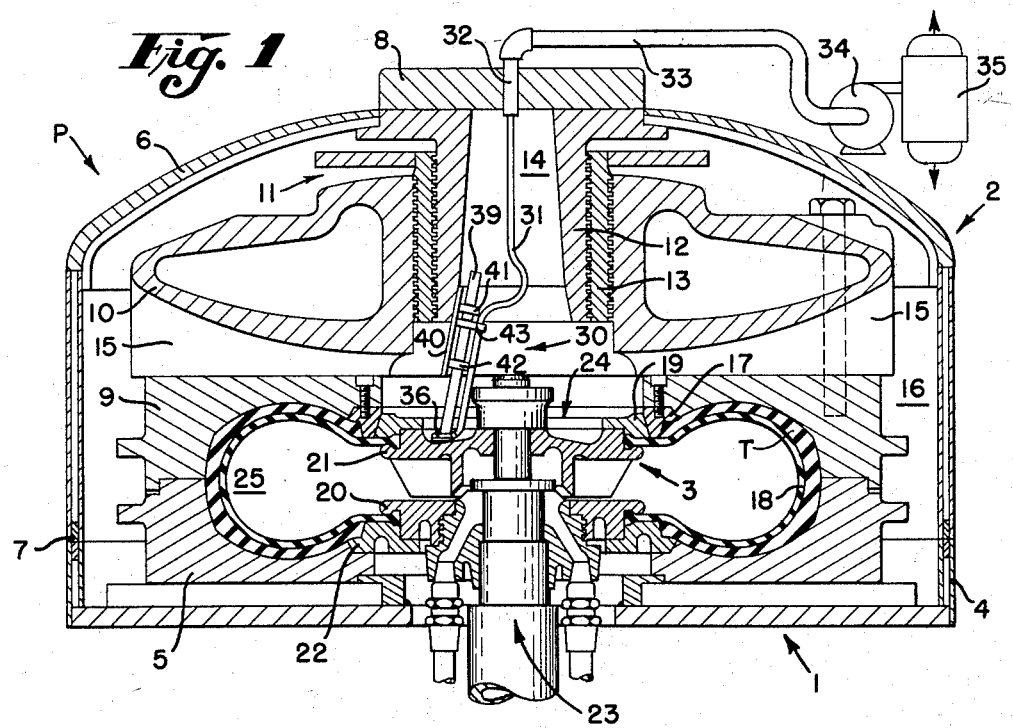
Fig. 1
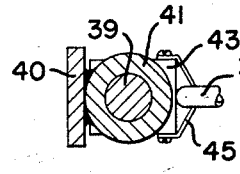
Fig. 3
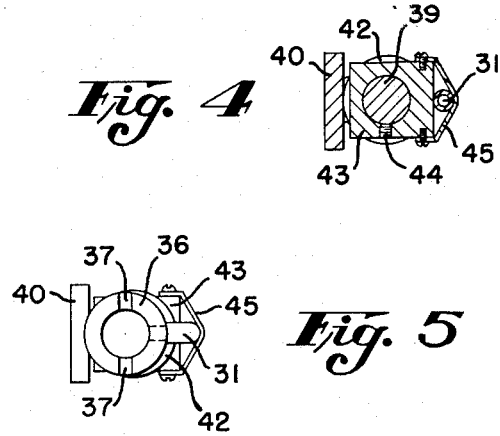
Fig. 4
Fig. 5
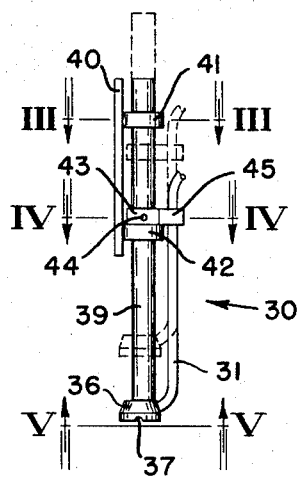
Fig. 2
INVENTOR.
RAYMOND E. BURKHART
BY
Harvey E. Bumgardner Jr.
ATTORNEY.

United States Patent Office 3,170,191
Patented Feb. 23, 1965

3,170,191
TIRE CURING PRESS
Raymond E. Burkhart, East Detroit, Mich., assignor to United States Rubber Company, New York, N.Y., a corporation of New Jersey
Filed July 19, 1963, Ser. No. 296,331
6 Claims. (Cl. 18—17)

This invention relates to improvements in steam dome type combination shaping and curing presses for tires. More particularly, it relates to means for removing from such presses, both immediately before and during the initial opening of the press upon the completion of a tire cure, of steam condensate which tends to collect, during cure, in the dish-shaped reservoir formed by the upper mold half, the top bead positioning ring, the top diaphragm clamping ring and the top diaphragm supporting ring of such a press.

Steam dome type combination presses of the same general type shown and described herein are well known and widely used in the art, being, for example, shown and described in United States Patent No. 2,775,789 to Soderquist. Such presses are characterized by the following description of operation. An uncured barrel-shaped carcass is placed between a stationary lower mold half and an upper mold half which is movable vertically as part of the movable top assembly of the press, and a steam inflatable cylindrically shaped flexible diaphragm or bag which is vertically disposed in concentricity with both of the mold halves and the tire carcass. With the carcass so positioned, the press automatically and concurrently lowers the upper mold half, lowers the upper edge of the diaphragm and injects steam under pressure into the diaphragm to press the tire carcass firmly against the mold, thereby shaping the tire. When the press has been fully closed, steam is additionally admitted to the interior spaces in the press surrounding the closed mold, the heat from steam surrounding the mold and the steam in the diaphragm combining to cure or vulcanize the tire. The tire is maintained between the heated and mold halves and diaphragm for the requisite vulcanization time, and, upon completion of the curing cycle, the steam is released from the diaphragm and the press and the movable top assembly of the press, including the upper mold half and top bead positioning ring are raised to allow removal of the cured tire.

During the curing cycle of such a press, any steam condensate which has formed on the upper mold half and elsewhere in the top assembly of the press has tended to accumulate in the natural reservoir formed by the upper mold half, the top bead positioning ring, the top diaphragm clamping ring and the top diaphragm support ring. This condensate must be eliminated before a subsequent tire can be cured. Formerly, this has been done by letting the hot condensate spill out when the press opened and then carrying the condensate away in open floor drains. This practice has created safety hazards and undesirable working conditions for the press operators and others in the press area.

Accordingly, it is an object of the present invention to provide a new and improved means for draining steam condensate from the reservoir formed by the upper mold half, the top bead positioning ring, the top diaphragm clamping ring and the top diaphragm supporting ring in a steam dome type tire shaping and curing press.

It is a further object of this invention to provide means for draining such condensate both before and during the initial opening of such a press upon completion of its curing operation.

For better understanding of the present invention together with other and further objects thereof, reference is had to the following description, taken in connection with the accompanying drawings, and the scope will be pointed out in the appended claims.

In the drawings:

FIG. 1 is a sectional view of the shaping and curing portion of a steam dome type combined shaping and curing press showing the improvement of this invention in operable position with the press closed.

FIG. 2 is an enlarged elevational view of the draining means of this invention in its position relative to its support with the press open, its position with the press closed being shown in dotted lines.

FIG. 3 is an enlarged sectional view taken on line III—III of FIG. 2.

FIG. 4 is an enlarged sectional view taken on line IV—IV of FIG. 3.

FIG. 5 is an enlarged sectional view taken on line V—V of FIG. 3.

Referring now to the drawings and particularly to FIG. 1, the press illustrated, indicated generally by P, is of the well known steam dome type. Consequently, only those elements thereof having particular bearing on the structure and functioning of the instant inventive improvement will be described in detail herein.

Broadly speaking, the portion of the press P illustrated in FIG. 1 may be said to comprise three main assemblies, the fixed press bottom assembly 1, the movable top assembly 2 and the diaphragm assembly 3. The fixed bottom assembly 1 comprises a lower casing 4 and a lower mold half 5.

The movable top assembly 2 comprises the upper casing or dome 6 which, when the press P is closed, forms a steam tight seal with the lower casing 4 at 7. The dome 6 is fixedly attached to and supported by the dome plate 8 which also supports all of the elements of the top assembly 2 located within the dome 6. The dome plate 8 is attached to means, not shown, for raising, lowering and tilting the entire top assembly 2 of the press P.

Within the dome 6, the upper mold half 9 is bolted or otherwise fixedly attached to a webbed support member 10. The support member 10 is attached to the dome plate 8 by means of the double screw threaded connection 11. The double screw threaded connection 11 includes a threaded annular inner member 12 which is supported from the dome plate 8 by a steam tight connection, and annular intermediate member 13 having its inner and outer surfaces threaded in opposite hands and the support member 10, the inner annular surface of which is threaded to mate with the intermediate member 13. As is apparent from the drawing, the inner member 12, the intermediate member 13, the support member 10 and the upper mold half 9 largely define a central chamber 14 in the top assembly 2, which central chamber 14 is open at several points 15 to the outer chamber 16 defined by the upper casing 6, the lower casing 4 and the aforementioned interior components of the press P. The final element shown in the drawing and comprising the top assembly 2 of the press P is the top bead positioning ring 17 which is attached by bolting or other suitable means to the upper mold half 9 and which serves to engage and position the uppermost bead region of the carcass to be shaped and cured.

The diaphragm assembly 3 comprises the diaphragm or bag 18, the upper and lower edges of which are gripped, respectively, between the top and bottom diaphragm clamping rings 19 and 20 and the top diaphragm supporting ring 21 and bottom bead positioning ring 22. As is apparent from the drawing, the various components of the diaphragm assembly 3 are all supported from a series of telescoping central shafts 23 the details of construction and operation of which are well known in the art and not pertinent to this invention.

In the conventional operation of the press P, after the tire carcass T has been shaped into the toroidal tire shape shown in FIG. 1, the top assembly 2 having been completely closed upon and sealed with the bottom assembly 1, steam is admitted, by conduits not shown, to the chamber 16 filling the chambers 16 and 14 and heating both mold halves 5 and 9 and the other interior elements of the press alike. In the process of transferring heat to the mold and other press components a portion of this stream condenses on the metal surfaces being heated. From an inspection of FIG. 1, it will be evident that a portion of this condensate forming on the upper mold half 9 as well as upon the walls of the chamber 14 will tend to run into and fill the dish shaped reservoir 24 defined by the upper mold half 9, the top bead positioning ring 17, the top bead clamping ring 19 and the top bead supporting ring 21.

After the press P has been maintained at curing temperature for a sufficient length of time to cure the tire T, the steam flow to the chamber 16 (and the diaphragm chamber 25) is shut off and the pressure relieved. Then the press P is opened by initially raising the entire top assembly 2. During the initial opening of the press P the upper mold half 9 and the top bead positioning ring 17 are separated from the lower mold half 5, the tire T and the top diaphragm clamping ring allowing most of any condensate present in the reservoir 24 to spill out therefrom. Subsequent raising of the top diaphragm clamping ring 19 and the top diaphragm supporting ring 21 by the action of the telescoping shafts 23 will cause still more condensate to spill out if any is still present on top of the tire T. It should be noted that, even as the press is initially opening, condensation of the low pressure steam trapped under the dome 6 will continue.

To prevent this spillage of hot condensate from the reservoir 24, the novel drain device 30 has been provided in the press P. Referring now particularly to FIGS. 1 and 2 with reference to FIGS. 3, 4 and 5 as needed for a clearer understanding of the structure of the drain device 30, it will be apparent that a flexible tubular conduit 31 has been provided within the chamber 14 the top end of which is connected to a tubular fitting 32 in the dome plate 8 of the press P. The tubular fitting 32 is, in turn, connected exterior to the press P, to a system of suitable flexible and rigid conduits 33 communicating with the inlet of a remotely located vacuum pump 34 shown schematically in FIG. 1. The outlet of the vacuum pump 34, in turn, communicates with a separator 35 for disposal of the condensate sucked by the pump 34 through the conduits 31 and 33. The lower end of the conduit 31 is connected with and communicates with the interior of an inverted cup member 36 which is designed to rest upon substantially the lowest portion of the reservoir 24 when condensate is being sucked therefrom. One or more slots 37 are provided in the lip of the cup member 36 to permit condensate to more easily flow from said reservoir 24 into said cup member 36.

In order to permit the suction end of the conduit 31 and the cup member 36 to depend into substantially the lowest portion of the reservoir 24 when the press P is closed and to remain there even while the press P is being initially opened by raising the top assembly 2, but to eventually move away from the diaphragm assembly 3 with the top assembly 2 after the press P has been initially opened, the cup member 36 is affixed to a rod 39 which is slideably mounted with respect to the top assembly 2 in a vertical or near vertical position. To accomplish these objectives, a mounting bracket 40 provided with two coaxial tubular bearings 41 and 42 is fastened to the top assembly 2, preferably to the interior surface of the inner threaded member 12, in such a position that the rod 39 may slide vertically or nearly vertically in said bearings 41 and 42, it being necessary that the force of gravity should cause the rod 39 to slide in said bearings 41 and 42 when the press P is opened. To limit the travel of the rod 39 with respect to the bottom bearing 42 an adjustable collar or guide block 43 is fastened to the rod 39 between the bearings 41 and 42 by a set screw 44. The flexible conduit 31 is given intermediate support from the guide block 43 by means of the clamping band 45 which prevents the lower portion of the conduit 31 from falling into the reservoir 24 when the press P is closed.

The drain device 30 functions in conjunction with the press P in the following manner. Substantially simultaneously with the completion of the curing cycle of the press P and the shutting off of the steam flow thereto, the pump 34 applies suction, either by the starting of the pump or the opening of a valve (not shown), to the conduit 31. A short delay ensues while the press P is being depressurized and the bulk of the condensate is sucked from the reservoir 24. Then the press P is initially opened by raising the top assembly 2. As the top assembly 2 initially rises the rod 39 slides downward in the bearings 41 and 42 permitting the conduit 31 and the cup member 36 to maintain suction at substantially the lowest portion of the reservoir 24 thereby sucking out almost all of the remaining and fresh condensate. When the top assembly 2 has been raised a sufficient distance to permit air and steam flow between the press interior and the atmosphere and the consequent forestalling of any substantial further condensation the guide block 43 comes to rest against the lower bearing 42 as shown in FIG. 2 and the drain device 30 thereafter moves with the top assembly 2.

While both the press P and the drain device 30 may be operated manually, in modern industrial plants they would normally be operated automatically or semi-automatically. In such event the operation of the drain device 30 (its suction cycle) would be programmed, by conventional means well known in the art and not forming part of this invention, into the control system for the press P.

While a preferred form of the invention has been shown and described, it will be appreciated that this is for the purpose of illustration and that modifications and changes may be made therein without departing from the spirit and scope of the invention.

Having thus described my invention, what I claim and desire to protect by Letters Patent is:

1. In a steam dome type combined shaping and curing press for tires, said press having a movable top assembly including an upper mold half and a top bead positioning ring and having a diaphragm assembly including a top diaphragm clamping ring and a top diaphragm supporting ring, said upper mold half and all of said rings together comprising a reservoir for the collection of steam condensate while said press is performing its curing operation, the improvement comprising means provided for removing said condensate from substantially the lowest portion of said reservoir before and during the initial opening of said press upon completion of said curing operation.

2. In combination with a steam dome type combined shaping and curing press for tires, said press having a movable top assembly including an upper mold half and a top bead positioning ring and having a diaphragm assembly including a top diaphragm clamping ring and a top diaphragm supporting ring, said upper mold half and all of said rings together comprising a reservoir for the collection of steam condensate while said press is performing its curing operation, the combination comprising a conduit through which said condensate may be sucked from said reservoir and means for positioning the suction end of said conduit at substantially the lowest portion of said reservoir both before and during the initial opening movement of the top assembly of said press upon completion of said curing operation.

3. In combination with a steam dome type combined shaping and curing press for tires, said press having a movable top assembly including an upper mold half and a top bead positioning ring and having a diaphragm assembly including a top diaphragm clamping ring and a top diaphragm supporting ring, said upper mold half and all of said rings together comprising a reservoir for the collection of steam condensate while said press is performing its curing operation, the combination comprising a conduit through which said condensate may be sucked from said reservoir, an inverted cup member connected to the suction end of said conduit and means for positioning said cup member at substantially the lowest portion of said reservoir both before and during the initial opening movement of the top assembly of said press upon completion of said curing operation.

4. The combination of claim 3 wherein said cup member is provided with at least one slot in the lip thereof for the admission of condensate from said reservoir into said cup.

5. The combination of claim 3 wherein said positioning means includes a rod slidably mounted with respect to said top assembly of said press in a position such that one end of said rod depends into said reservoir, said depending end of said rod being attached to said cup member.

6. In combination with a steam dome type combined shaping and curing press for tires, said press having a movable top assembly including an upper mold half and a top bead positioning ring and having a diaphragm assembly including a top diaphragm clamping ring and a top diaphragm supporting ring, said upper mold half and all of said rings together comprising a reservoir for the collection of steam condensate while said press is performing its curing operation, the combination comprising a conduit through which said condensate may be sucked from said reservoir and means for positioning the suction end of said conduit at substantially the lowest portion of said reservoir both before and during the initial opening movement of the top assembly on said press upon completion of said curing operation, said last mentioned means including a bracket provided with two axially aligned bearings affixed to said movable top assembly, a rod slidably mounted in said bearings to slide coaxially therein, the axis of said rod and said bearings being so oriented that said rod will slide therein under the force of gravity and so that the lower end of said rod may depend into said reservoir, said conduit being connected to the lower end of said rod.

References Cited in the file of this patent
UNITED STATES PATENTS

| | | |
|---|---|---|
| 2,812,545 | Soderquist | Nov. 12, 1957 |
| 2,846,722 | Soderquist | Aug. 12, 1958 |
| 2,911,670 | Soderquist | Nov. 10, 1959 |
| 2,970,342 | Frohlich et al. | Feb. 7, 1961 |
| 2,989,779 | White | June 27, 1961 |
| 2,997,740 | Soderquist | Aug. 29, 1961 |
| 3,012,277 | Soderquist | Dec. 12, 1961 |
| 3,029,469 | Moore et al. | Apr. 17, 1962 |
| 3,041,667 | Harris | July 3, 1962 |